United States Patent Office.

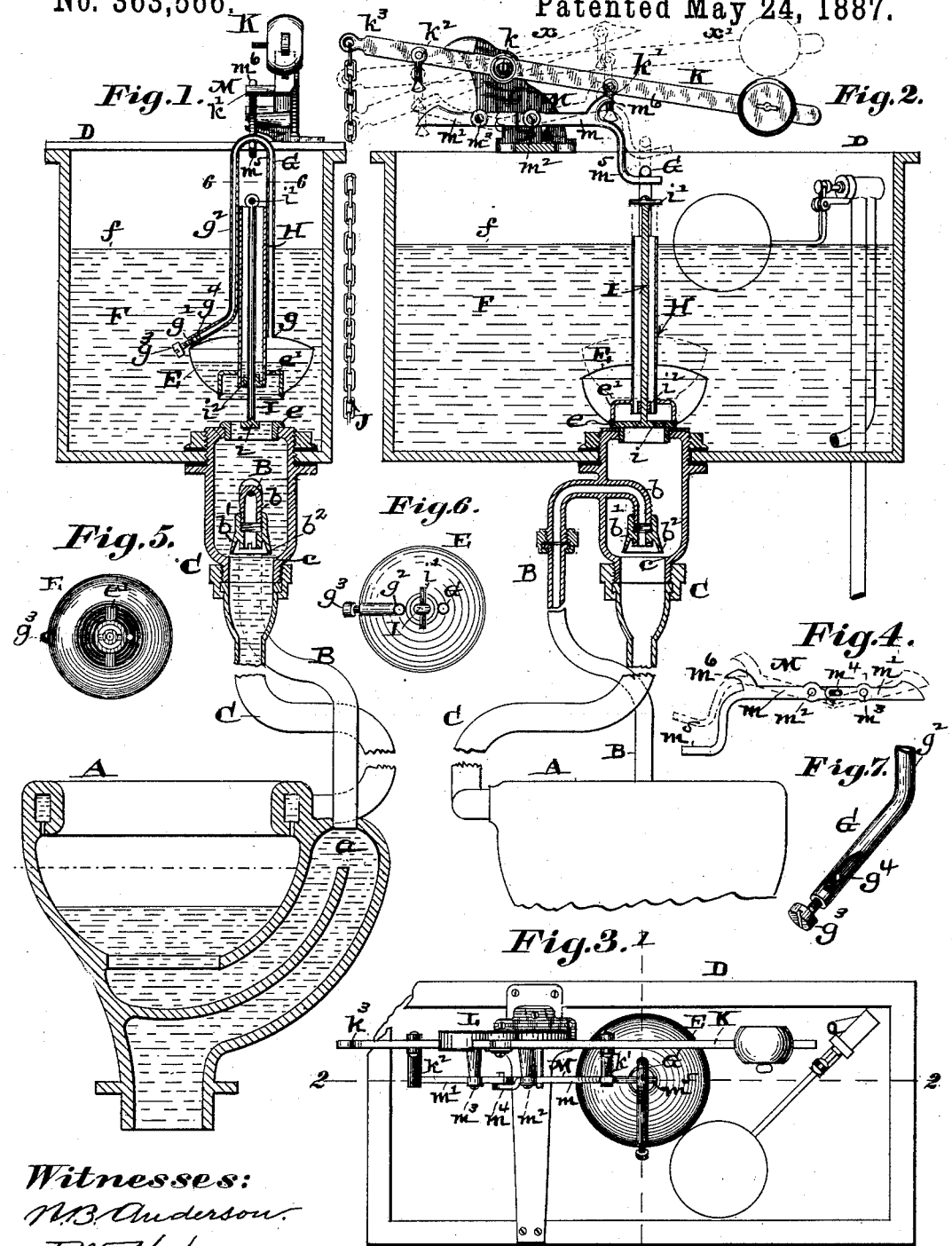

PETER WHITE, OF ST. LOUIS, MISSOURI.

WATER-CLOSET OR ANALOGOUS STRUCTURE.

SPECIFICATION forming part of Letters Patent No. 363,566, dated May 24, 1887.

Application filed December 27, 1886. Serial No. 222,668. (No model.)

*To all whom it may concern:*

Be it known that I, PETER WHITE, of St. Louis, Missouri, have made a new and useful Improvement in Water-Closets or Analogous Structures, of which the following is a full, clear, and exact description.

The improvement relates to the means for discharging and for regulating the discharge of the air from the tank-valve to the overflow-pipe of the tank, and to other minor features, hereinafter described, reference being had to the annexed drawings, making part of this specification, in which—

Figure 1 is a vertical section on the line 1 1 of Fig. 3. Fig. 2 is a vertical section on the line 2 2 of Fig. 3. Fig. 3 is a plan of the structure. Fig. 4 is a side elevation of the fore and after wash lever. Fig. 5 is a bottom view of the tank-valve. Fig. 6 is a horizontal section on the line 6 6 of Fig. 1, and Fig. 7 is a view in perspective of the outer end of the tank-valve air-outlet pipe.

The same letters of reference denote the same parts.

A, Figs. 1 and 2, represents the customary bowl of a water-closet whose contents can be discharged by siphonic action, to which end the siphon-pipe B leads from the chamber $a$ of the bowl A upward, and at its upper end passing into and pointing downward in the pipe C, which discharges the water from the tank D into the closet-bowl.

All the parts thus far named are of the usual form and operated in the usual manner, saving that the downwardly-pointing end $b$ of the siphon-pipe B is provided with a thimble, $b'$, which, by screwing it upward and downward upon the pipe end $b$, can be adjusted to bring the lower edge, $b^2$, of the thimble farther from or nearer to the shell $c$ of the discharge-pipe C, and thus provide for properly regulating the action of the siphon-pipe.

The tank-valve E, which serves to regulate the discharge of the water F from the tank D into the pipe C, is of the hollow type, the water, when the valve is seated, as in Fig. 2, draining from within it into the pipe C, and when the valve is unseated, as in Fig. 1, rising into the valve. As the water enters the valve the air is discharged from the upper part of the interior of the valve, and it is to the manner in which the air is discharged that the present improvement in part relates. In a construction patented to me December 14, 1886, the air is discharged from the tank-valve into the water within the tank. There is an opening in the shell of the tank-valve, through which the air escapes, and the water is kept from entering to any undesirable extent through the opening by means of a check-valve. In the present construction, also, the air is discharged from the interior of the tank-valve into the water of the tank, but as follows:

G represents a pipe communicating at $g$, Fig. 1, with the interior of the tank-valve, and thence leading upward to above the surface $f$ of the water F when the tank-valve is seated, and then turning and extending downward so as to bring the outer end, $g'$, of the pipe below the surface of the water. The pipe in the shape described may serve incidentally as a means for lifting the tank-valve; but it is more especially desirable for two reasons—no check-valve is required at the outer end of the pipe or elsewhere in it to prevent the water without from passing through the pipe into the tank-valve, for although the outer end of the pipe in some way is made to open into the water of the tank for the air to escape the water cannot rise in the part $g^2$ of the pipe above the level of the water, and hence cannot pass into the tank-valve; secondly, it makes it practicable to regulate the escape of the air, and thus regulate the closing of the tank-valve. This is accomplished, preferably, as follows: A plug, $g^3$, is adapted to be screwed into the end $g'$ of the pipe. The farther inward the plug is screwed the more the perforation $g^4$, Figs. 1, 7, (through which the air escapes from the pipe,) is closed, and the farther outward the plug is screwed the perforation is enlarged accordingly. The larger the perforation the sooner the air can escape and the quicker the tank-valve can seat.

H represents a tube attached to the tank-valve and open at both ends; and it extends upward to bring its upper end above the normal level of the water-surface when the tank-valve is seated, and it extends downward through the top of the tank-valve to bring its lower end below the surface of that portion of the water which enters the tank-valve when it is unseated, substantially as is shown in Fig. 1—that is, when the tank-valve is lifted, the water around it at once enters it and seals the lower end of the tube H, so that the air from within the tank-valve cannot pass into the tube; nor can the outer air pass downward through the tube and cause noise as the water is discharged from the tank into the pipe C. The tube remains thus sealed until the tank-valve is again seated, when it operates to vent the pipe C and tank-valve, and then all water within the tank-valve drains downward and the action of the siphon-pipe B is arrested.

I represents a rod serving to guide the tank-valve in its movement. It is fastened by means of the cross-bar $i$ to the valve-seat $e$, Figs. 1, 2, and it thence extends upward through the tube H, and at its upper end is provided with a stop, $i'$, to limit the upward movement of the tank-valve and tube H. The tank-valve is steadied by means of the bar $i^2$, which is attached to the tube H and is perforated for the rod I to work in it. The bar $i^2$ does not close the tube H against the passage of the air when the tank-valve is seated, as above described. The part $e'$ is an open-work construction, such as a cross-bar, serving to stiffen the lower portion of the tank-valve and tube H. The tube H also serves as an overflow-pipe in the event the water rises too high in the tank.

The seat (not shown) of the closet-bowl, when used, is depressed, drawing upon the connection J, which leads upward from the seat to the weighted lever K, causing the lever to change from its position shown in full lines in Fig. 2 into its position shown in broken lines $x$, Fig. 2. The lever is pivoted at $k$ to a suitable standard, L, upon the tank, and at the sides respectively of the pivot is provided with the swinging trips $k'$ $k^2$.

M represents a compound lever, termed the "fore and after wash lever," whose parts $m$ and $m'$ (and respectively at $m^2$ and $m^3$) are pivoted to the standard L. The parts $m$ $m'$ have a pin-and-slot connection, $m^4$, by which means, and by means of the projections $m^5$ $m^6$ upon the part $m$ and the trips $k'$ $k^2$ upon the lever K, the following results are produced: The projection $m^5$ engages by means of the bent pipe G with the tank-valve. The trip $k'$, when the weighted end of the lever K is down, swings under the projection $m^6$. When the opposite end of the lever K, by the depressing of the closet-seat is depressed, the trip $k'$ acts to start the tank-valve from its seat, thereby providing for what is termed the "fore-wash," whereupon the projection $m^6$ becomes disengaged from the trip $k'$ and the tank-valve seats. The described movement of the lever K has also brought the other trip, $k^2$, under the outer end of the part $m'$ of the lever M, and when the pressure upon the closet-seat is removed the end $k^3$ of the lever K rises, causing the outer end of the lever part $m'$ to rise, and in consequence the outer end of the lever part $m$ also to rise, and thus to again lift the tank-valve and produce what is termed the "after-wash." If it is desired to have the after-wash only, the trip $k'$ can be swung upward, and by any suitable means, (not shown,) permanently or for the time being, disengaged from the lever part $m$; also, by similarly disengaging the trip $k^2$ from the other lever part, $m'$, only the fore-wash can be used. The dotted lines $x'$, Fig. 2, indicate another position of the lever M.

Several of the features herein described can be used to a greater or less extent with each other, and also with other mechanism, and they are of special value when united in a water-closet mechanism in the manner set forth.

I claim—

1. In combination with the tank and tank-discharge pipe, the hollow tank-valve having the air-outlet pipe leading upward from the valve to above the water-surface and then downward to beneath said surface, substantially as described.

2. In combination with the hollow tank-valve and the air-outlet pipe leading upward from the valve to above the water surface and then downward to beneath said surface, and perforated, as described, the adjustable plug, substantially as and for the purpose set forth.

3. The combination of the tank-valve, the bent air-outlet pipe extended upward and downward and perforated, as described, and the connection for lifting the tank-valve, as described.

4. The combination of the tank-valve, the tank, the tank-valve seat, the overflow-tube, and the guide-rod within the tube, said overflow-tube being extended upward above the normal level of the water-surface when the valve is seated, and downward through the top of the valve to bring the lower end below the surface of that portion of the water which enters the valve when it is unseated, and said tank-valve being hollow, substantially as described.

Witness my hand.

PETER WHITE.

Witnesses:
C. D. MOODY,
J. W. HOKE.